Patented Oct. 6, 1936

2,056,271

UNITED STATES PATENT OFFICE 2,056,271

TREATING ANIMAL SILK

Georges Heberlein, Wattwil, Switzerland, and Walter Elsaesser, Ridgewood, N. J., assignors to Heberlein Patent Corporation, New York, N. Y., a corporation of New York No Drawing. Application November 23, 1931, Serial No. 576,942. In Germany November 24, 1930

2 Claims. (Cl. 8—20)

This invention relates to novel effects on animal silk and to processes for producing such effects. The object of the invention is to provide natural or animal silk goods in which there is a permanent modification of the physical characteristics of the silk itself, such as characteristic appearance and/or characteristic feel or "hand". The term "animal silk" as herein employed has the usual meaning associated with these words, namely, the fine strong lustrous fiber or goods therefrom produced by silk worms and containing a nitrogenous material. The term that is herein employed does not include the so-called artificial silks prepared from regenerated cellulose and other forms thereof and also excludes cotton. Processes for modifying cotton and for modifying the artificial silks produced from cotton or like cellulose material have been known and practised for some time. For example, by the processes known as mercerization the luster of cotton is increased and by treatment of the artificial silks with various swelling reagents, the luster of these latter cellulose silks have been diminished and other properties have been imparted to them. The reactions using the same reagents on cotton on the one hand and the regenerated celluloses known as artificial silks on the other, are quite different. Reagents which would destroy artificial silk have a beneficial effect for example on cotton and reagents which would have no effect on cotton have a beneficial effect on the artificial silks. In spite of the related constitution of these two types of substances, it could not have been predicted in advance that the reactions on one would have differed so widely from reactions on the other. With chemically different substances such as found in animal silk, the reaction of the various reagents would be even more unpredictable. It has now been unexpectedly found in accordance with the present invention that animal silk may be improved or ennobled in the same general manner as for cellulose and cellulose derivatives by the action of swelling agents upon such animal silk.

The ennoblement of the animal silk comprises an increase in transparency and a change in the luster of the silk, or an equalization of the fiber, an effect which is particularly important in silk cloth. This equalization as produced by the agents given below, results in rendering the cloth more uniform in appearance throughout. There also occurs more or less stiffening of the silk with an improvement in the feel or hand thereof. In addition the affinity of the animal silk for dyestuffs is altered and according to the conditions chosen this affinity is more or less increased.

As will be more fully explained below according to our invention a variety of novel effects in natural and animal silk may be obtained. The effects may be obtained as pattern effects on the silk or as all-over effects. Pattern effects are obtained if strong swelling action is carried out locally on the silk. Both imprinting and resist-printing may be employed. The process hereinbelow discussed is applicable to all kinds of natural silk. Animal silk may be treated in loose, spun or woven or other desired form, either as such or mixed with other fibers and also in the form of mixture weaves.

When animal silk is acted upon by a swelling agent, the swelling action of structural change brought about in the fiber depends upon the reagent and the time, temperature and concentration employed in the process. It has been found in accordance with the present invention that mild reaction conditions tend to equalize the fibers, stronger reactions increase the stiffening whereby generally a change in the luster then occurs.

The conditions surrounding the reactions should, of course, be chosen in a way such that chemical decomposition of the silk fiber does not occur. The condition should be such that decomposition is avoided while the wished-for degree of ennoblement is obtained. This can be accomplished by variation of the various factors mentioned without difficulty.

As swelling agents alkali hydroxides, particularly sodium and potassium lyes; mineral acids for example sulfuric, phosphoric and hydrochloric acids; solutions of simple and complex salts such as zinc chloride, copper and nickel oxide ammonium, alkaline copper glycerin solution, and sulpho-cyanide salts, may be employed. According to the desired degree of ennoblement the concentration of the agents may be varied within wide limits, but preferably higher concentrations are to be employed, particularly when alkalis and acids are used. The temperature of the treating baths according to the kind of swelling agent employed is normal, lowered or raised. In the case of mineral acids, low temperatures act favorably because they tend to hold back the decomposition of the fiber. Higher temperatures on the contrary assist the action of salts and alkalis. The length or duration of treatment may range from fractions of one second or several seconds to several hours.

Provided the chemical nature of the reagents when mixed permits such procedure, mixtures of two or more swelling agents may be employed successfully. Also successive action of two or more swelling agents with or without an intermediate washing with water or other solvents can be employed. For example preliminary treatment with mineral acids is followed by washing and then by treatment with caustic potash. While the fibrous material is being soaked or treated in swelling baths, the material may be kept loose or maintained under tension according to the desired effect. The degumming (Aufschliessung) of the silk prior to the treatment thereof with the swelling means should be given particular attention. According to the nature of the silk it is recommended that degumming be more or less completely carried out. The cleansing and bleaching of natural silk employing agents such as acids, alkalis and oxidizing agents, of course, is well known. These reagents, however, have not possessed the characteristics required to produce the permanent effects produced by the practice of the present invention. The usual bleaching of the silk with oxidizing agents may be effected prior to or after the treatment with swelling agents.

The following examples are given as embodiments of the invention. It is to be understood that these examples are illustrative and that the invention is not restricted to the specific embodiments therein given, except as indicated in the appended claims.

*Examples*

1. Degummed and bleached animal silk muslin is passed for thirty seconds through a bath containing zinc chloride solution of 65° Bé., the temperature of the bath being maintained at 50° C. Immediately thereafter the tissue is washed out. After drying the material is considerably more transparent while still soft and supple.

2. Upon Japon silk tissue sulfuric acid of 54° Bé. is allowed to act for five seconds at 5° C. After washing and drying increased transparency is secured and a stiffening of the fabric is noted.

3. Animal silk thread yarn or woven fabric is dipped in a bath consisting of caustic potash of 40° Bé. at 40° C. and after one minute's action is rinsed at once in cold water. As a result the thread or other material is equalized, becomes somewhat more transparent and remains soft and supple.

4. Silk muslin is passed for 15 minutes through a bath containing a solution of calcium sulphocyanide of 34° Bé., the temperature of the bath being maintained at 30° C. The muslin so treated is then rinsed in water at 15° C. and dried. After drying the material is more transparent, its luster has been considerably reduced and it has become somewhat stiffer.

5. Animal silk thread is dipped in a bath consisting of copper oxide ammonia solution having a content of 2 grams of copper per liter at 50° C. and after 30 minutes action this is followed by rinsing in water at 15° C. The result of this treatment is that the silk has become more reactive to acid dyestuffs. For example, if a piece of the untreated silk and of the silk treated as just described are placed in a sour bath of Victoria blue B (Color Index No. 729), the result of such dyeing is that the treated silk is dyed more deeply than the untreated.

The above treatments may be carried out in apparatus like that employed for mercerization of cotton.

The above treatments, while causing an increase in translucency and other effects noted, do not cause substantial shrinkage.

Thus while we have described our improvements in detail and with respect to certain preferred forms, we do not desire to be limited to such details or forms since, as will be understood by those skilled in the art after understanding our invention, many changes and modifications may be made and the invention embodied in widely different forms without departing from the spirit and scope thereof in its broader aspects, and we desire to cover all modifications, forms and embodiments coming within the scope of any one or more of the appended claims.

Having thus described our invention, what we claim as new and desire to secure by Letters Patent, is:—

1. A process for producing a modified animal silk which comprises subjecting animal silk to an aqueous acid-reacting inorganic material of about 54° Bé. as a swelling agent, for less than about one minute at a relatively low temperature to effect a permanent increase in at least one of its following natural physical characteristics:— translucency, stiffness, without substantial shrinkage.

2. A process for producing a modified animal silk which comprises subjecting animal silk to sulphuric acid of about 54° Bé. for less than about one minute at a temperature below room temperature, to effect a permanent increase in at least one of its following natural physical characteristics:—translucency, stiffness.

GEORGES HEBERLEIN.
WALTER ELSAESSER.